United States Patent Office 3,510,733

Patented May 5, 1970

3,510,733

SEMICONDUCTIVE CRYSTALS OF SILICON CARBIDE WITH IMPROVED CHROMIUM-CONTAINING ELECTRICAL CONTACTS

Arrigo Addamiano, Willoughby, Ohio, assignor to General Electric Company, New York, N.Y.

No Drawing. Continuation-in-part of application Ser. No. 549,787, May 13, 1966. This application Dec. 23, 1966, Ser. No. 604,125

Int. Cl. H01l 9/00

U.S. Cl. 317—234 2 Claims

ABSTRACT OF THE DISCLOSURE

Chromium wire and several chromium-containing alloys including also iron, nickel, or both, are shown to make useful ohmic contacts to n-type silicon carbide, and useful rectifying contacts to p-type SiC semiconductive crystals. Uses include contacts to injection electroluminescent crystals and SiC incandescent resistor devices.

This is a continuation-in-part of application Ser. No. 549,787, filed May 13, 1966.

The present invention relates to silicon carbide semiconducting devices with improved contacts of electrical conductors. More specifically, it relates to new and improved metals and alloys discovered to be useful in making electrical contacts to silicon carbide semiconductive crystals.

Silicon carbide semiconductive crystals have utility in a variety of electrical applications. The characteristic of silicon carbide of remaining extrinsically semiconductive to much higher temperatures than silicon, germanium and many other semiconductive crystalline materials permits silicon carbide to be used in high temperature applications, e.g., 500° C. and higher.

Silicon carbide crystals have also been found to be useful for the production of light in at least two types of applications, namely, injection electroluminescence whereby the recombination of holes and electrons at a p-n junction is associated with emission of photons, and incandescence generated by electrical self-resistance heating with alternating current.

Particularly for use with injection electroluminescence and for other applications as well, it is necessary to provide suitable non-rectifying contacts with low enough electrical resistance to avoid overheating the crystals. The efficiency of the injection electroluminescence phenomenon generally increases as temperature decreases. Although many types of crystals which do display injection electroluminescence with an applied direct current require very low temperatures for effective light output such as in the liquid nitrogen temperature region, silicon carbide produces the phenomenon satisfactorily at room temperature, but heating by contact resistance could raise the temperature of the crystal to an undesirably high level and require artificial cooling. Previously available electrode materials were not wholly satisfactory in this regard.

Considerable difficulty has been experienced in identifying suitable materials for making satisfactory electrical contacts to silicon carbide crystals, especially for use at elevated temperatures. In addition to the stringent requirements for mechanical bonding and chemical compatibility, e.g., avoidance of extremely low melting eutectics, the electrical characteristics of said contacts are so critical as to control the utility of any devices made hereby. Considering the electrical characteristics, such contacts may be either ohmic or rectifying. Also, a contact that may be ohmic on acceptor-doped or p-type silicon carbide may be rectifying when used with donor-doped or n-type silicon carbide. The electrical nature of the contact is not determined simply by whether the contact is mechanical or involves alloying. Furthermore, just as silicon carbide itself can be doped with excess-electron-producing elements to make it n-type or excess-hole-producing elements to make it p-type, so also can the contact materials be modified by the addition of certain elements. This, of course, has an effect on whether the region of contact between the electrical conductor and the semiconductive crystal is ohmic or rectifying.

In order to take the full economic advantage of the high temperature capabilities of silicon carbide semiconductive crystals, it is desirable that the electrical conductors used as current leads which form electrical contacts with the silicon carbide crystals be both ductile at handling temperatures and oxidation resistant at any temperature at which they are exposed to oxidizing atmospheres, either continuously or momentarily.

Previously available electrical contacts to silicon carbide have been relatively limited in adaptability. For instance, it has been quite difficult to find suitable electrode materials to provide satisfactory mechanical adhesion to silicon carbide. Although the contact materials disclosed in the literature are useful for many purposes, they do not completely fulfill the desired characteristics including those discussed above. Materials that have been found to provide electrical contacts with silicon carbide semiconductive crystals include platinum and its alloys with tin, boron and aluminum; gold alloys with transition metals; and pure or doped silicon. Also, tungsten, molybdenum and their alloys are disclosed as forming suitable ohmic contacts, especially over broad areas, by R. N. Hall in Pat. No. 3,030,704, assigned to the assignee of the present invention. Hall also describes techniques useful in producing contacts to silicon carbide crystals.

It is an object of the present invention to provide silicon carbide semiconductive crystals with electrical contacts which are ductile and oxidation resistant as well as not being excessively expensive or difficult to affix to the crystals.

A further object of the invention is to provide such crystals with contacts that are resistant to oxidation in air at temperatures at which the silicon carbide itself incandesces.

Another object of the invention is to provide such semiconductor crystals with electrical contacts that are more rugged and ductile than those available according to the prior art at equivalent expense.

Still another object of the invention is to provide n-type silicon carbide crystals with non-rectifying ohmic contacts of acceptably low resistance and to provide p-type silicon carbide crystals with rectifying contacts, each having the above-described properties.

Another object of the invention is to provide silicon carbide crystals with electrical contacts of small area which can be controlled to desired intricate patterns for the production of complex electrical devices.

Further objects and advantages of the invention will appear from the following detailed description of species thereof.

Briefly stated, the present invention, in some of its aspects, provides for the satisfaction of these objects by the use of wire of ductile chromium or alloys containing significant amounts of chromium along with either iron, or nickel, or iron and nickel, said alloys containing at least 5 weight percent chromium. (Percentages herein are by weight except where indicated otherwise.) However, with chromium-iron alloys, to gain the advantage of the invention, it is necessary to avoid composition ranges which are susceptible to formation of the embrittling sigma phase.

This means that essentially binary chromium-iron alloys useful in the invention can contain chromium either in the range of about 5 to 25 percent or over about 70 percent. Since the sigma phase region is known to shift for alloys of other compositions, the additional limitation "ductile" is herein meant to exclude alloy compositions susceptible to the formation of embrittling sigma phase. The composition of the leads is limited by the requirement that it be ductile and oxidation resistant. The contacts of the leads to silicon carbide crystals may be produced by heating the crystal on a graphite electrical resistance heater with the leads in contact with the surface of the crystal to a temperature at which melting, and probably eutectic formation, occur at the point of contact between the materials of the lead wire and the silicon carbide itself. It has been observed that the lead wires used in the present invention wet silicon carbide so well that the surface tension of the liquid causes small enough crystals of silicon carbide to rise out of contact with the graphite heater, when the lead wires are held in fixed position above the crystal.

Pure chromium suitable for such lead wires is available in ductile form produced by iodide decomposition or produced electrolytically with a low enough content of interstitial impurities, particularly oxygen and nitrogen. Furthermore, certain commercial alloys have also been demonstrated to be effective including an alloy of approximately 20% chromium, 80% nickel. Also found to produce good results is an alloy of 15% chromium, 60% nickel, balance iron. Stainless steels 302, 304 and 420, the generic composition of which can be defined as 11–20% chromium, up to 12% nickel, up to 2% manganese, up to 1% silicon, and up to 0.3% carbon, balance iron, have also produced successful contacts in accordance with the invention. Heating of the crystals may be done in a bell jar and preferably in an argon atmosphere in accordance with the teachings of Hall in Pat. 3,030,704, cited above.

As examples of the practice of the present invention, pure ductile cromium wire having a diameter of about 0.005 inch was placed in contact with the upper face of a silicon carbide platelet located on a flat graphite heater in a bell jar. The jar was first exhausted to about 5$\mu$ absolute pressure, then flushed three times with 99.999% pure argon, and finally filled with argon to silghtly less than atmospheric pressure. Upon passing current through the graphite heater, thus raising the temperature of the silicon carbide crystal and the chromium wire contacting it, the crystal was observed to lift off of the heater upon wetting of the crystal by the liquid phases formed between it and the chromium wire at a temperature observed by an optical pyrometer to be in the region of 1800–1900° C. With similar processing, 0.002 inch diameter wires of 302, 304 and 420 stainless steels gave similar results with excellent bonds to 1600–1700° C., while an alloy of approximately 20% chromium, 80% nickel for the wire required only 1500–1600° C.

These experiments were performed with three different types of silicon carbide platelet crystals:

(1) Crystals which were not intentionally doped and were almost colorless, usually p-type, (2) Green, nitrogen-doped n-type crystals, and (3) Dark blue to black p-type crystals doped with boron, or aluminum, or boron and aluminum.

The contacts made to n-type crystals were all ohmic with contact resistances negligible compared to the resistance of the crystals. Contacts to the p-type material instead were rectifying.

Chromium as a significant constituent of alloys for the lead wires, namely more than about 5%, seems to be necessary to obtain the advantages of the invention including effective ohmic contact and oxidation resistance combined with ductility. The wetting reaction between the contact wire and the silicon carbide probably involves many complex chemical reactions not presently understood but which result in satisfactory products. As an indication of the possible complexity of the interface bond, it has been reported in the literature that the following compounds exist: $Cr_{23}C_6$, $Cr_7C_3$, $Cr_3C_2$, $Cr_3Si$, $Cr_2Si$, $CrSi_2$, and CrSi. Undoubtedly, other compounds enter into the melting reaction when binary or ternary alloys are used for the lead wire. Actually, contacts made according to the present invention have been so strong that when the lead wires were pulled away from the crystals they tore out large sections of the crystals themselves.

While the materials disclosed as useful as contacts herein have proven fully satisfactory, it is known in the metallurgy of stainless steels that alloy systems of chromium with iron and of chromium, iron and nickel contain composition ranges having brittle phases, for instance, the brittle sigma phases present at low temperatures in certain parts of the chromium-iron system. Also, excessive amounts of carbon in such metals may cause grain boundary segregation, embrittlement and loss of corrosion resistance and oxidation resistance. Those skilled in the art will be able to select readily allays of chromium with iron, or nickel, or iron and nickel that have suitable ductility and oxidation resistance.

Contacts may be made according to the invention readily enough for both simple and intricate contact configurations. Very small area contacts may be made with the ends of fine wires, wires may be laid edgewise on the crystals, non-wire forms such as strip, ribbon or etched forms may be used, and the designer of the electrical device using the invention has available considerable flexibility in design.

What I claim as new and desire to secure by Letters Patent of the United States is:

1. A semiconductive crystal of silicon carbide having fused to it at least one electrical lead of an alloy consisting essentially of about, by weight, 20% chromium, 80% nickel.

2. A semiconductive crystal of silicon carbide having fused to it at least one electrical lead of an alloy consisting essentially of about, by weight, 11–20% chromium, up to 12% nickel, up to 2% manganese, up to 1% silicon, and up to 0.3% carbon, balance iron.

References Cited

UNITED STATES PATENTS

| | | | |
|---|---|---|---|
| 3,436,614 | 4/1960 | Magatsu et al. | 317—234 |
| 3,205,101 | 9/1965 | Mlavsky et al. | 148—171 |
| 3,201,666 | 8/1965 | Hall | 317—237 |
| 3,121,829 | 2/1964 | Huizing et al. | 317—237 |
| 2,973,466 | 2/1961 | Atalla | 317—240 |

JOHN W. HUCKERT, Primary Examiner

M. H. EDLOW, Assistant Examiner

U.S. Cl. X.R.

29—589; 317—235